Patented Dec. 19, 1939

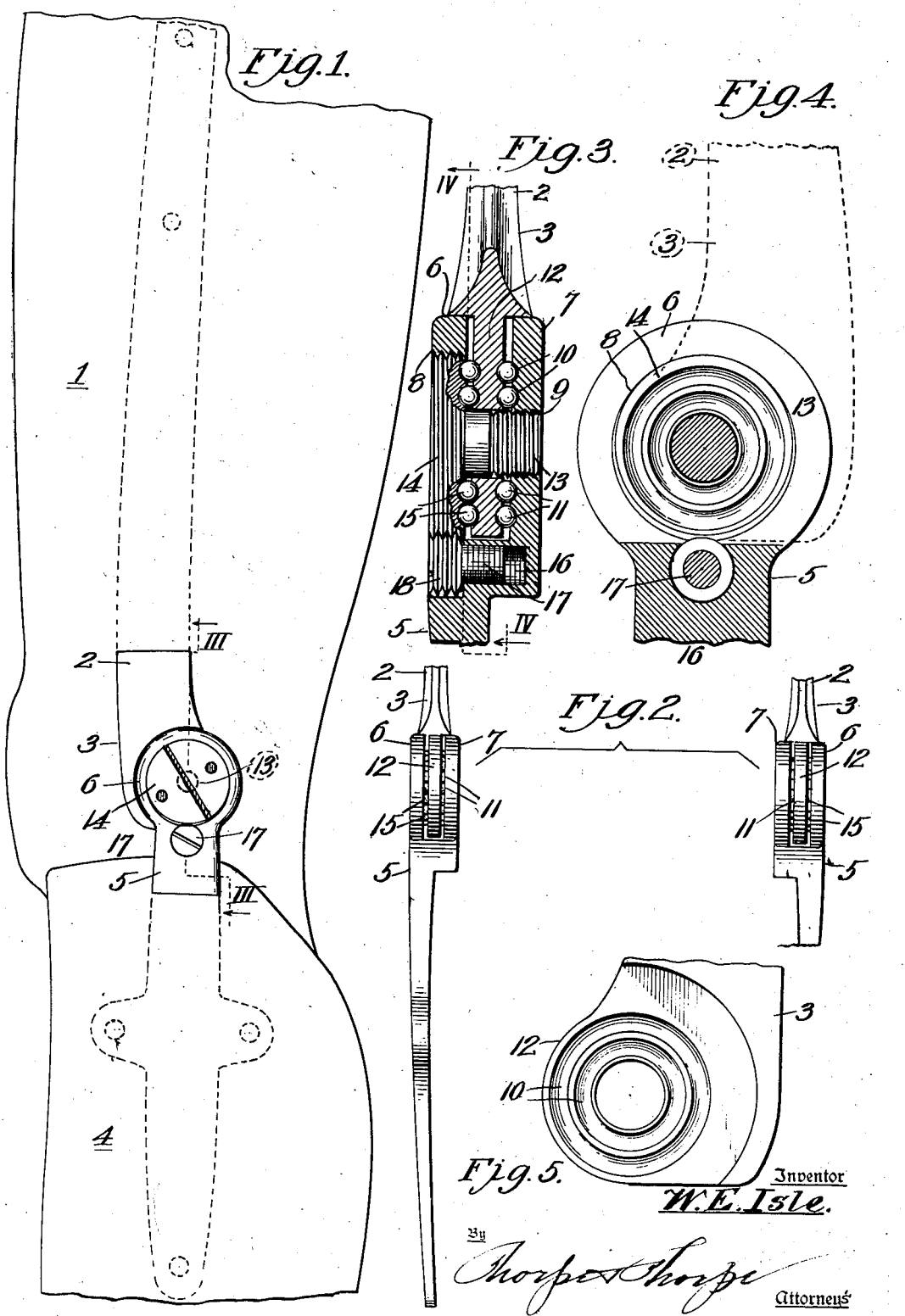

2,183,814

UNITED STATES PATENT OFFICE 2,183,814

NUT AND BOLT LOCK

William E. Isle, Kansas City, Mo.

Application October 24, 1938, Serial No. 236,631

2 Claims. (Cl. 151—25)

This invention relates to locks for threaded structural members of any kind. The lock is peculiarly advantageous in locking the cones forming part of artificial knee joints because it is flush with the outer face of the joint and thus avoids all protuberances which frequently chafe and catch on the wearer's clothing; and which, moreover, has been found to constitute a perfect lock whereby the desired knee tension imposed will be maintained by the cone against accidental loss of adjustment in service.

With the general object named in view and others as will hereinafter appear, the invention consists in certain new and useful features of construction and combination of parts as hereinafter described and claimed; and in order that it may be fully understood, reference is to be had to the accompanying drawing, in which—

Figure 1 is a side elevation of a joint and lock embodying the invention, as they will appear in use.

Figure 2 is a fragmentary rear view of the construction shown in Figure 1, but with the upper portion of the wearer's leg and the lower socket omitted.

Figure 3 is an enlarged section taken on the line III—III of Figure 1.

Figure 4 is a section on the line IV—IV of Figure 3, but indicating the part outside or back of the plane of the section, in dotted lines.

Figure 5 is a fragmentary view of the head part of the upper member of the hinge or joint.

In the drawing, where like reference characters identify corresponding parts in all of the figures, 1 represents the upper leg of a wearer to which is secured, in any suitable manner, the side straps 2 of the upper hinge member 3, the lower portion of the wearer's leg being received within any suitable socket member 4 carrying the lower hinge members 5. Each of the lower hinge members on opposite sides of the leg, is bifurcated at its upper end to form a pair of heads 6 and 7 which are generally circular and having axially alined threaded openings 8 and 9 respectively, the latter being of considerable less diameter than the former. In addition to its threaded opening 9, the inner face of the head 7 is preferably formed with a pair of concentric ball races 10 for cooperative engagement with sets of balls 11, having their opposite sides fitting in concentric ball races formed in the proximate face of a generally circular head 12 of the upper hinge member 3.

To fasten the two hinge members securely together and yet leave them perfectly free for pivotal movement, a so-called cone member has a threaded end 13 engaging the threaded opening 9 in the head 7, and a larger circular head 14 peripherally threaded and engaging the opening 8 of head 6. The inner face of the cone head 14 has concentric ball races receiving sets of balls 15 engaged also with ball races in the adjacent face of the head 12. The cone also has a kerf or spanner sockets or both as shown (Figure 1), for engagement by a suitable tool to effect turning movement of the cone.

It will be apparent that the two threaded openings in the heads 6 and 7, and the corresponding threaded portions 13 and 14 of the cone, must be of the same pitch so that the cone can be screwed home. The quadruple set of balls are relatively small so that the races in the members are relatively shallow, leaving more metal in the parts and therefore a stronger joint. The use of small balls also permits of plural ball races to provide a bearing surface of maximum width against lateral strain and consequently reduces the friction imposed by such strains in the sense that it is spread over a greater area, particularly when the cone is locked in position at one edge, as will hereinafter appear.

Great difficulty has heretofore been encountered in devising an efficient lock for artificial leg knee joints to reliably hold the cones in adjusted position. In order, therefore, to lock the cone in position, one of the heads of the bifurcated joint member, preferably the head 6, is provided with a threaded opening 16, preferably paralleling the axis of the cone, into which a locking member 17 is threaded. In the preferred form of lock, the outer end of the threaded opening 16 is counterbored to intersect the perimeter of the threaded opening 8, to a distance substantially equal to the depth of the threads on the cone. The threaded locking member 17 is provided with an enlarged head having parallel corrugations 18 received in the counter-bore or socket, the corrugations 18 being so designed that the locking member may be threaded down until the head is flush with the outer surface of the joint, and then the cone is threaded down in engaged relation with said corrugations until the desired friction is imposed on the ball joint. The face of the head may be provided with a screw driver slot so that by rotating the same its corrugations will impose wedge-like or clamping pressure on the threads of the cone head and thus the two members, the cone and the locking member, are reliably secured against independent or simultaneous rotation leading to an accidental change in the adjustment of the tension on the knee joint.

From the above description, it will be apparent that I have produced a construction embodying all of the features of advantage set forth as desirable, and while I have described and illustrated the preferred embodiment, it is to be understood that I reserve the right to all changes properly falling within the spirit of the invention and without the ambit of the prior art.

I claim:

1. In a device of the character described, a structural member having a pair of parallel threaded openings, the outer end of one opening being counter-bored to provide an unthreaded socket intersecting the wall of the other opening, a member threaded into the socketed opening and having a locking head formed with a plurality of annular wedge surfaces projecting into the other opening, and a clamping member threaded into the second opening and enmeshed with the locking head, said locking head being adapted to apply wedging pressure against the threads of the threaded clamping member to lock the parts against rotation after the clamping member has been adjustably positioned, by threading a short distance in or out.

2. In a device of the character described, a structural member having a pair of juxtaposed threaded openings, the outer end of one opening being counter-bored to provide an unthreaded socket intersecting the wall of the other opening, a member threaded in the socketed opening and having a series of annular ridges projecting into the other opening, and a clamping member threaded in said other opening, the threads of said clamping member receiving the ridges of the locking member, said locking member being adapted to be rotated after positioning of the clamping member to impose pressure on the threads of the latter to lock both members against accidental rotation.

WILLIAM E. ISLE.